(12) United States Patent
Brinkman et al.

(10) Patent No.: US 10,506,017 B2
(45) Date of Patent: Dec. 10, 2019

(54) MANIPULATION OF PDF FILE CONTENT THROUGH HTTP REQUESTS

(71) Applicant: Adobe Inc., San Jose, CA (US)

(72) Inventors: John Brinkman, Ottawa (CA); Leonard Rosenthol, Huntingdon Valley, PA (US)

(73) Assignee: Adobe Inc., San Jose, CA (US)

( * ) Notice: Subject to any disclaimer, the term of this patent is extended or adjusted under 35 U.S.C. 154(b) by 293 days.

(21) Appl. No.: 15/160,202

(22) Filed: May 20, 2016

(65) Prior Publication Data

US 2017/0337216 A1    Nov. 23, 2017

(51) Int. Cl.
*G06F 17/30* (2006.01)
*H04L 29/08* (2006.01)

(52) U.S. Cl.
CPC .................... *H04L 67/02* (2013.01)

(58) Field of Classification Search
USPC ................. 715/269; 707/827, 709
See application file for complete search history.

(56) References Cited

U.S. PATENT DOCUMENTS

| | | |
|---|---|---|
| 7,698,628 B2 | 4/2010 | Perelman et al. |
| 8,134,553 B2 | 3/2012 | Saini et al. |
| 8,209,598 B1 | 6/2012 | Pandey |
| 8,549,471 B2 | 10/2013 | Jung et al. |
| 8,561,088 B2 | 10/2013 | Kim et al. |
| 8,856,805 B2 | 10/2014 | Poore et al. |
| 9,053,443 B2 | 6/2015 | Chmiel et al. |
| 9,268,758 B2 | 2/2016 | Gonser et al. |
| 9,355,081 B2 | 5/2016 | Zhang et al. |
| 9,459,862 B2 | 10/2016 | Araya et al. |
| 9,471,204 B2 | 10/2016 | Akolkar et al. |

(Continued)

FOREIGN PATENT DOCUMENTS

| | | |
|---|---|---|
| CA | 2796433 C | 10/2011 |
| CN | 103731483 | 4/2014 |

OTHER PUBLICATIONS

"List of PDF Software", retrieved from the Internet: https://en.wikipedia.org/wiki/List_of_PDF_software#Development_libraries, 19 pages.

(Continued)

*Primary Examiner* — Hung T Vy
(74) *Attorney, Agent, or Firm* — Finch & Maloney PLLC

(57) ABSTRACT

Techniques are disclosed for extraction and modification of Portable Document Format (PDF) file content using Hyper Text Transfer Protocol (HTTP) requests. A PDF web server is configured to receive HTTP requests from a client which identify a PDF document and a type of access or operation (e.g., content or attribute modification, content extraction, etc.). The HTTP requests include Uniform Resource Locator (URL) path to identify components of the identified PDF document upon which the requested operations are to be performed. The PDF web server is further configured to invoke function calls to a PDF parser library to perform the requested operations. These techniques eliminate the need for client software to include relatively complex PDF parser libraries, instead allowing the client to access and manipulate the PDF document in a simpler and more efficient manner. In some cases, the PDF web server may be incorporated in a PDF viewer.

19 Claims, 6 Drawing Sheets

(56) References Cited

U.S. PATENT DOCUMENTS

| | | |
|---|---|---|
| 9,495,429 B2 | 11/2016 | Miranker |
| 9,928,050 B2 | 5/2018 | Aslam et al. |
| 2003/0225829 A1 | 12/2003 | Pena et al. |
| 2010/0131869 A1 | 5/2010 | Adachi et al. |
| 2011/0173589 A1 | 7/2011 | Guttman et al. |
| 2011/0231784 A1 | 9/2011 | Meng et al. |
| 2013/0054812 A1 | 2/2013 | Decoteau |
| 2014/0298318 A1 | 10/2014 | Ahn et al. |
| 2014/0309983 A1 | 10/2014 | Lerum et al. |
| 2014/0324943 A1 | 10/2014 | Antipa |
| 2015/0074522 A1* | 3/2015 | Harned, III ........... G06F 17/214 715/269 |
| 2015/0113019 A1* | 4/2015 | Jiang ...................... G06F 16/95 707/709 |
| 2017/0359403 A1 | 12/2017 | Brinkman et al. |

OTHER PUBLICATIONS

Gite, "Linux / UN IX FTP Commands Tutorial," 2013, available at https://www.cyberciti.biz/faq/linux-unix-ftp-commands/ (Year: 2013).
Subhash, "How to Read a PDF File From a URL in Java," 2010 available at https://www.gnostice.com/nl_article.asp?id=207&t= How_To_Read_A_PDF_File_From_A_URL_In_Java (Year: 2010).

* cited by examiner

MANIPULATION OF PDF FILE CONTENT THROUGH HTTP REQUESTS

FIELD OF THE DISCLOSURE

This disclosure relates to techniques for manipulation of Portable Document Format (PDF) file content, and more particularly, to techniques for extraction and modification of PDF file content and associated attributes using Hyper Text Transfer Protocol (HTTP) requests.

BACKGROUND

PDF files or documents may generally include various types of data, and other resources, which can be of value to consumers of the PDF files. This data may be as simple as the text and images rendered on the screen by a PDF viewer, but can also include file attachments, form data, annotations, metadata, bookmarks, and more. Although these data resources have value to a variety of applications, in order to extract such content from a PDF file, application developers must create, purchase, or otherwise include relatively sophisticated PDF parser libraries in their applications. These PDF parser libraries are typically written in low-level languages such as C, C#, C++, and Java, which tend to be complex and often require a higher level of programming skill to create and maintain. This typically results in an application development process that is more complex and costly than would otherwise be the case. Additionally, it is difficult to deploy the combination of application and PDF parser libraries to client computers and devices. For example, existing PDF viewers or editors (e.g., Acrobat) can perform many types of document content modification functions (e.g., highlight, tag, edit, annotate, play, etc.). Web browser applications, however, are typically limited in their capability, and often provide only relatively simple document content display functions. This is generally due to the difficulty of developing and deploying browser applications with PDF processing capabilities for client computers.

DETAILED DESCRIPTION

Figure 1:
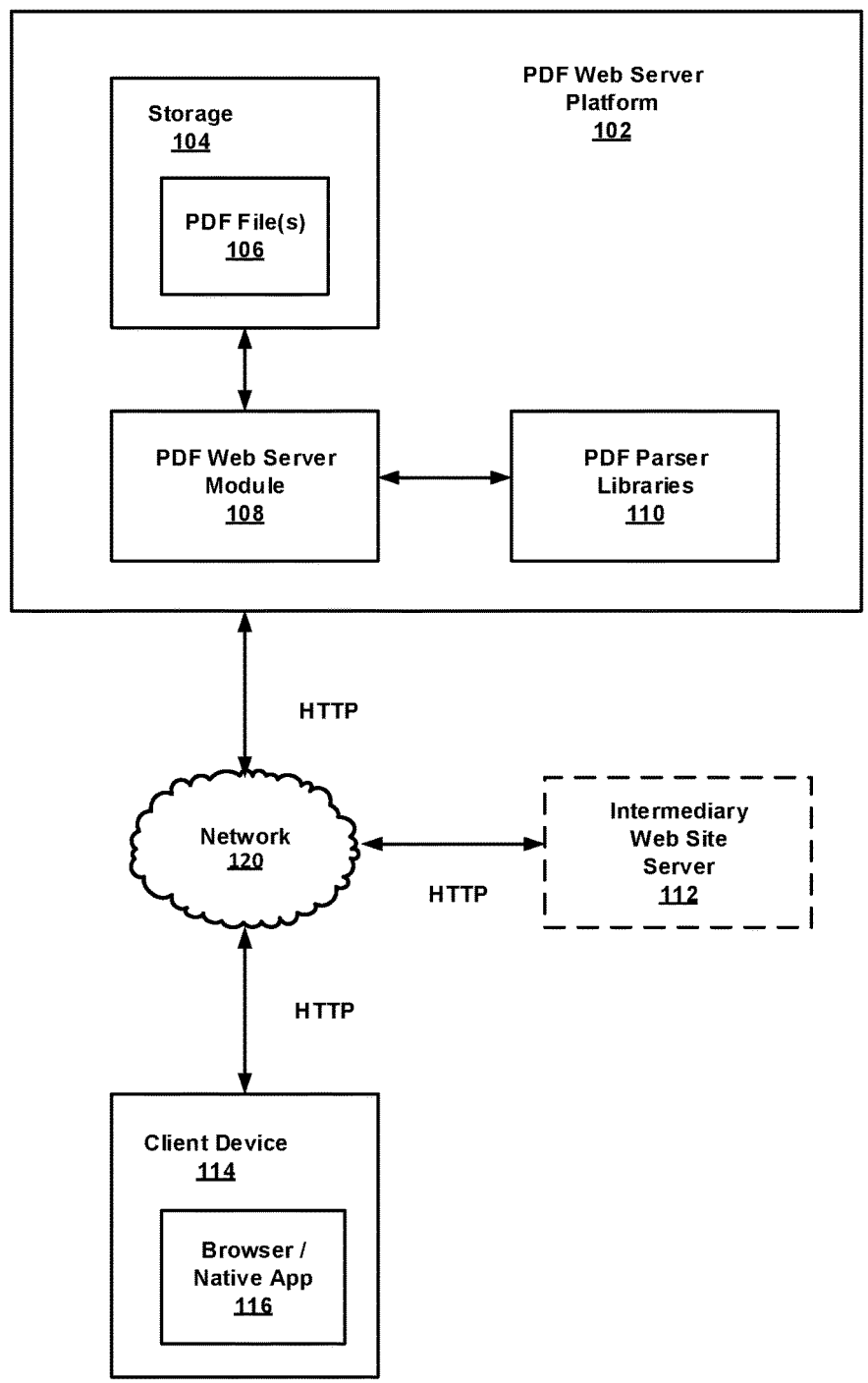
FIG. 1 is a block diagram of a PDF web server implementation, configured in accordance with an embodiment of the present disclosure.

There are instances where it is desirable for an application, executing on a client device, to be able to access and/or manipulate Portable Document Format (PDF) files stored on a server system. For example, a user of a handheld device (e.g., the client) may run a web browser application on that device to connect to an online shopping web page on the internet. The shopping web page is typically hosted on a server system or platform. As part of this online shopping activity, the user may wish to browse through a catalog or view more specific information about a product, such as, for example, a user's manual, a table of contents of a book, a color chart, customer reviews, etc. Any of these types of information may exist as documents which may be stored in PDF format, either on the shopping site's server or at another remote location accessible to that server. For example, in some instances, the PDF files may be stored on other servers that act as a repository for such documents, perhaps maintained by the product manufacturer or other third parties. In another example scenario, a user may wish to fill out an online application or form of some type (e.g., a credit card application at banking web site or a driver's license application at a state government web site). Here again, the user may attempt to access that web site through a browser application or other native software executing on the user's device or computer (e.g., the client), and the bank or government web site server may provide the requested application form as an editable PDF document which the user can then complete. In any event, the server may be configured to download the relevant PDF files to the client, where the user requested operations could then be performed. In order to accomplish this, however, the client browser application would need the capability to parse those PDF files in order to gain access to the file contents and other various components related to the user's requests. In order to provide such capability, the developers of native applications (such as a web browser) for client devices, would generally need to create, purchase, or license relatively sophisticated PDF parser libraries for inclusion in their applications. These PDF parser libraries are typically written in low-level languages such as, for example, C, C#, and Java, and tend to be complex, often requiring a higher level of programming skill to create and maintain. Alternatively, if purchased or licensed, the cost for inclusion in each deployed copy of the client application may be prohibitive.

To this end, and in accordance with an embodiment of the present disclosure, techniques are disclosed to simplify the development and deployment of client based applications that may benefit from the capability to access and/or manipulate PDF file content. These techniques provide for extraction and modification of PDF file content by the server, rather than the client, based on Hyper Text Transfer Protocol (HTTP) requests received from the client. HTTP is advantageously suited to this task, as it is relatively simple to implement from the client side, with support available from many high-level languages such as JavaScript, Python, Ruby, etc. Additionally, HTTP is already in common use to provide internet communication between clients and servers.

In more detail, and in accordance with an embodiment of the present disclosure, a PDF web server is configured to receive HTTP requests from any number of clients. The requests may identify a PDF document and a type of access or operation (e.g., content or attribute modification, content retrieval or extraction, etc.). The HTTP requests may include a Uniform Resource Locator (URL) path to identify components of the PDF document upon which the requested operations are to be performed, as will be explained in greater detail below. One example of such a URL is http://my_pdf_server/foo.pdf/info/author. The PDF web server is further configured to analyze the HTTP requests and invoke function calls to a PDF parser library to perform the requested operations.

These techniques may eliminate the need for client software to include complex PDF parser libraries, instead allowing the client to access and manipulate the PDF document in a simpler and more efficient manner through the PDF web server, as specified by HTTP requests. For example, continuing with one of the example scenarios described above, a user, via a browser application executing on a client device, requests to see the table of contents of a book prior to purchasing from an online publishing web site. The client device in turn generates an HTTP request to retrieve the table of contents. The request may be in the relatively simple form of "GET http://my_pdf_server/foo.pdf/info/table_of_contents," although other variations are possible, as will be apparent in light of this disclosure. The "GET" command is an HTTP verb used to indicate a request for retrieval of information, while the URL identifies the PDF web server, file name and file component. The PDF web server analyzes this request, locates the file, and generates and executes a segment of code to perform the required operations to accomplish the task and return the results, including invocations of the appropriate functions in a PDF parser library. The client browser application is thus automatically provided the capability to parse the PDF file in order to gain access to the file contents and other various components related to the user's request. The access gained may allow, for instance, modification of content of the PDF file, modification of attributes of the PDF file, and extraction of content from the PDF file, to name a few examples.

System Architecture

FIG. 1 is a block diagram of a PDF web server implementation 100, configured in accordance with an embodiment of the present disclosure. As can be seen, a client-server configuration is implemented which includes a client device 114, communicatively coupled to a PDF web server platform 102, via a communication network 120. In some embodiments, the network may include the internet. The client device 114 may be any type of computing or communication device such as, for example, a workstation, desktop computer, laptop, handheld computer, tablet, smartphone, and the like. The client device 114 may be configured to run a web browser or other native application 116 for communication over network 120.

The PDF web server platform 102 is shown to include a storage facility 104, a PDF web server module 108, and PDF parser libraries 110. The platform 102 may also include a processor and other hardware and software, as described in greater detail in connection with FIG. 6, below. The storage facility 104 is configured to store one or more PDF files 106. In some embodiments, the storage facility may be located remotely from the platform 102 and any suitable communication mechanism may be used to retrieve the files to the PDF web server platform for processing. In other embodiments, the files may remain at a separate hosting location and the processing may be performed remotely.

The PDF web server module 108 may be configured to receive HTTP requests from client device 114 over network 120 and to analyze those requests to identify a PDF file and a type of requested access to the identified file. The PDF web server module 108 may be further configured to invoke one or more function calls to the PDF parser libraries 110, based on the type of requested access. The invoked functions of the parser libraries 110 are configured to operate on the identified PDF document to fulfill the client requests, as will be described in greater detail below.

In some embodiments, the PDF web server platform 102 may co-exist with, or otherwise host, the server with which the client device is attempting to interact. In other words, the PDF web server platform 102 may share, to at least some extent, the hosting of the online shopping web site (or any other such web site) that the user is interested in accessing. In some embodiments, however, the online shopping web site (again, just as an example) may be located in the position of the intermediary web site server 112, independent of the PDF web server platform 102. In this case, the client device would interact with the intermediary web site server 112 through network 120 and, in the event that this interaction involves access to a PDF file, the intermediary web site server 112 may call on PDF web server platform 102 to perform the requested operations by generating HTTP requests for transmission through network 120 to PDF web server platform 102.

Figure 2:
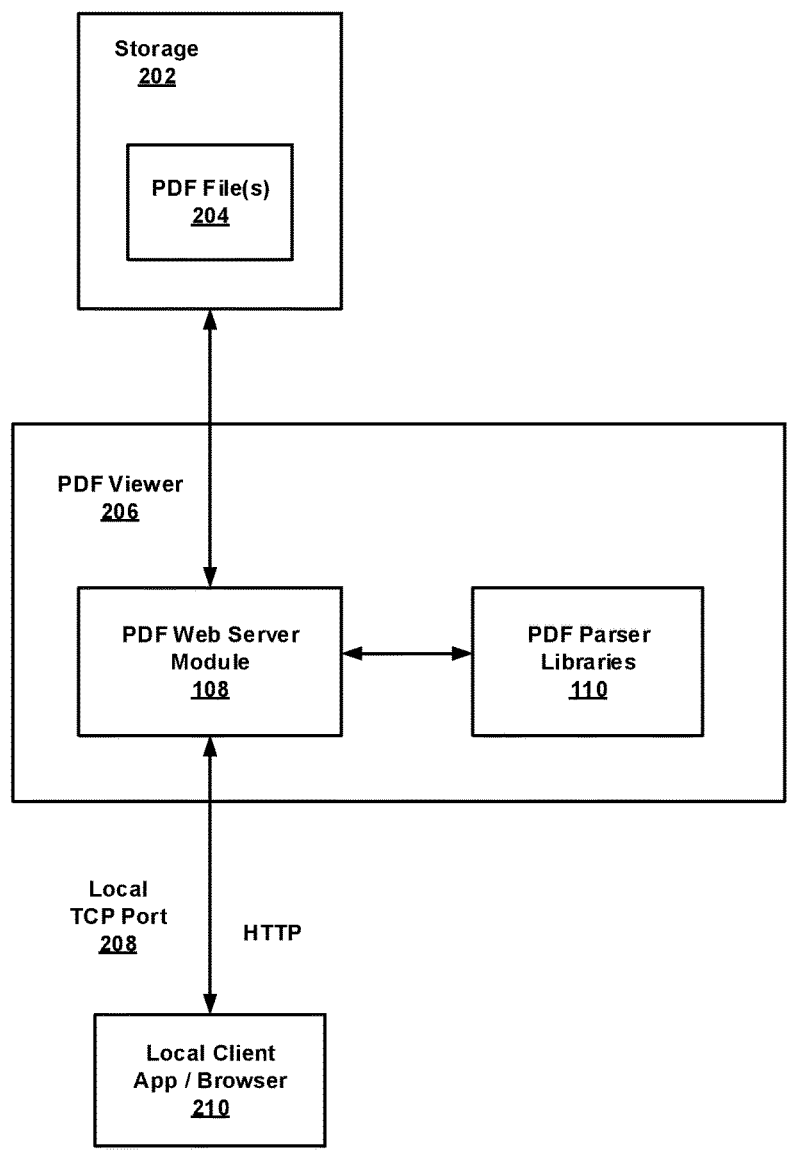
FIG. 2 is a block diagram of another PDF web server implementation, configured in accordance with an embodiment of the present disclosure.

FIG. 2 is a block diagram of another PDF web server implementation 200, configured in accordance with an embodiment of the present disclosure. In this embodiment, the PDF web server module 108 may be incorporated in a PDF viewer (or PDF processor) 206, which has access to PDF parser libraries 110. For example, the PDF libraries 110 may be built in, or otherwise linked to, the PDF viewer 206. In some embodiments, the PDF viewer may be a version of the Acrobat PDF processing tool. Further to this example, a local client application 210 (e.g., a browser or the like), may interact with the PDF web server module 108 of the viewer 206 using HTTP requests as previously described. In this case, however, the local client application 210 may execute on the same machine or platform as the PDF viewer (or on another platform connected through a local area network) and may communicate with it through a Transmission Control Protocol (TCP) port or other suitable mechanism. The PDF files to be accessed 204 may be located in storage 202, also associated with the common platform. It will be appreciated, in light of the present disclosure, that the PDF web server module 108 of this embodiment may provide the same advantages of simplified client access to PDF files as described previously in connection with the embodiment of FIG. 1.

Figure 3:
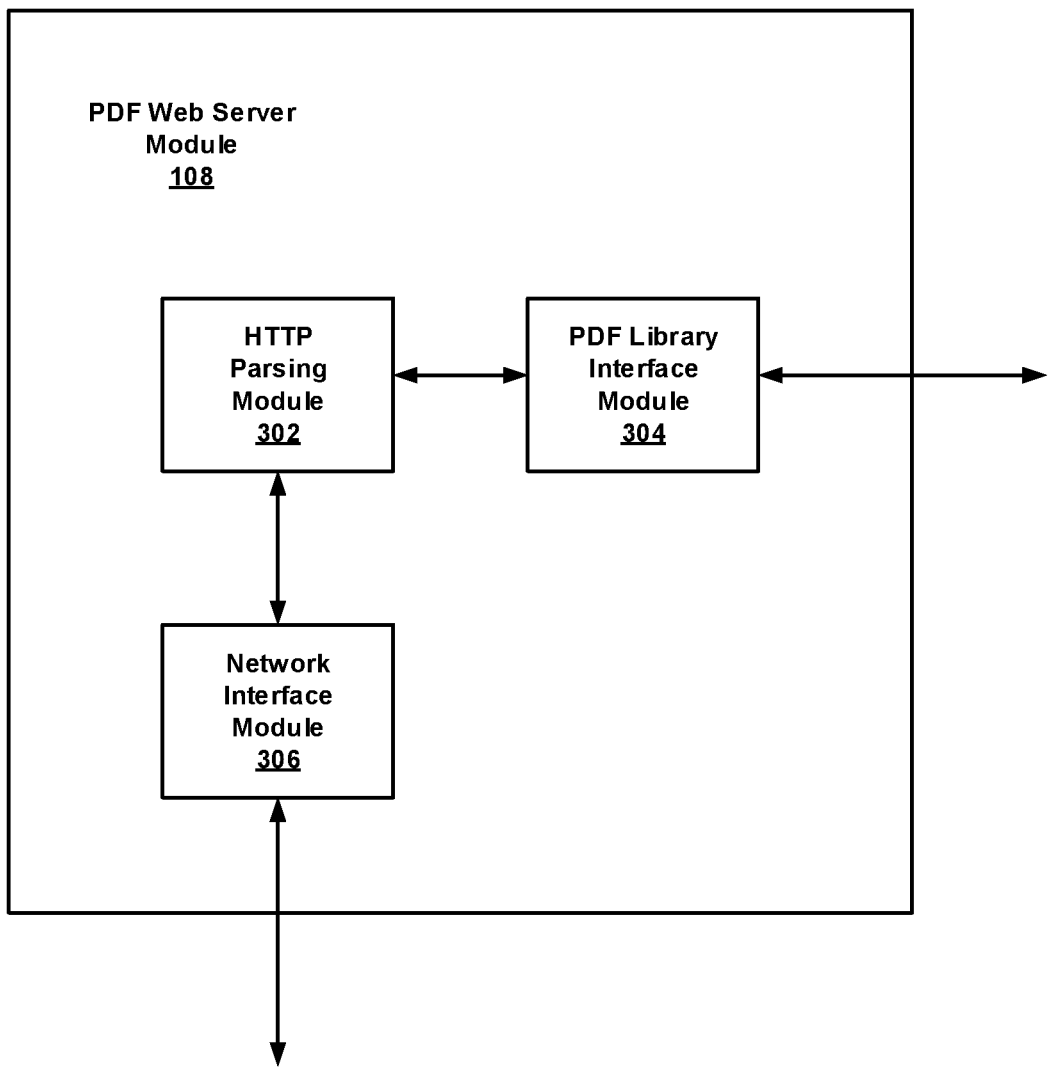
FIG. 3 is a more detailed block diagram of a PDF web server module, configured in accordance with an embodiment of the present disclosure.

FIG. 3 is a more detailed block diagram of a PDF web server module 108, configured in accordance with an embodiment of the present disclosure. PDF web server module 108 is shown to include an HTTP parsing module 302, a PDF library interface module 304, and a network interface module 306. Taken together, these various modules provide techniques for access to PDF file content, including extraction and modification, using HTTP requests.

The network interface module 306 may be configured to receive HTTP requests from a client. The HTTP requests may be received from a remote client device 114 over network 120 or from a local client 210 (e.g., executing on the platform 102). The network interface module 306 may also be configured to transmit results back to the client as an HTTP response. The results may include status information (e.g., success or failure), file content, or any other information that may be useful to the client. In some embodiments, the results, particularly file content, may be formatted as native PDF data structures. In some embodiments, the results may be translated to JavaScript Object Notation (JSON), Extensible Markup Language (XML), or other format convenient for the client.

The HTTP parsing module 302 may be configured to parse the HTTP requests to identify a PDF file specified by the client and to determine the type of requested access to that file or document. The HTTP requests may include any of the standard HTTP verbs that specify the type of action requested, including, for example, "GET," "PUT," "POST," "PATCH," and "DELETE." The HTTP request may further include a Uniform Resource Locator (URL) path configured to identify the PDF web server, the file name, and the file component to be accessed. Examples of components that may be associated with PDF files include file content (text and/or images), attachments, form data, annotations, metadata, and bookmarks, to name a few. An example HTTP request may be configured as "GET http://my_pdf_server/foo.pdf/info," which is a request to obtain information about the file "foo.pdf" from the PDF web server "my_pdf_server." The PDF file identified from the parsing of the HTTP request (e.g., "foo.pdf") may be stored, for example, on storage facility 104 or at any other suitable location from which it can be located and accessed by the PDF web server module 108.

The PDF library interface module 304 may be configured to invoke one or more function calls to the PDF parser libraries 110, based on the type of requested access. The library function calls are configured to operate on the identified PDF document, or a copy thereof, and perform the operations necessary to achieve the requested access. For example, upon determining that an HTTP request to obtain a list of bookmarks associated with a specified PDF document has been received, the PDF library interface module 304 may identify one or more functions provided by the PDF parser library 110 to perform that task. The specific library function names, as well as the arguments that they might require, the order in which they may be invoked, as well as any additional supporting code that may be required, will generally depend on the particular library that is available for use, as many such libraries are commercially available, each potentially providing a unique interface. After identifying the appropriate library functions, PDF library interface module 304 may invoke those functions and provide any required information (for example, as arguments or parameters). The PDF library interface module 304 may further be configured to accept any results that are returned by those functions, for subsequent transmission back to the client as an HTTP response, possibly after translation to a format suitable to the client.

The following code segment is provided as an illustrative example, in accordance with an embodiment of the present disclosure, of the relative complexity of low level language code that may be generated or otherwise used to invoke invoked PDF parser library routines in response to an HTTP request. In this example, the code segment is configured to handle a user request to add an attachment to a PDF file, which may be expressed more simply in HTTP form from the client as: "PUT http://my_pdf_server/foo.pdf/attachment {attachment data}."

```
mg_result PDFAttachmentResponder::POST( MGRequest& inRequest )
{
    // attempt to open up the PDF specified
    if ( !mProcessor->OpenURI( inRequest ) )
    return MG_FALSE;
    // Use the PDFLibrary to determine if the file is prepared to accept an attachment
    CPDFNameTree
    efnt( mProcessor->CDoc( )->GetNameTree( std::string("EmbeddedFiles"), true ) );
        if ( efnt.IsValid( ) ) {
        // should be valid...
        bool
        propsNotFile = false;
        std::string
        attachPath( cmdPath );
        if ( boost::find_last( attachPath, "/properties" ) ) {
            boost::erase_last( attachPath, "/properties" );
            propsNotFile = true;
        }
    // Use the PDFLibrary to see if we are adding a new attachment or replacing an existing
one
        CCosObj
        efObj = efnt.Get( attachPath, true );
        if ( efObj.IsValid( ) && efObj.IsDict( ) ) {
            // if the file already exists
            if ( propsNotFile ) {
                // get some properties, not the entire file data
                if ( inRequest.Data( ).length( ) ) {
                    // check for valid
                    rapidjson::Document&
                    rDoc = inRequest.JSON( );
                    if ( rDoc.IsObject( ) ) {
                        // support posting from an object (since key/value pairs needed)
                        // for each of the properties provided,
                        // use the PDFLibrary to add the info to the existing attachment
                        DURING
                        CCosDict
                        efDict(efObj);
                        rapidjson::Value::ConstMemberIterator docIter =
                            rDoc.MemberBegin( );
                        while ( docIter != rDoc.MemberEnd( ) ) {
                            JSONMember
                            aMember( *docIter );
                            std::string
                            memName = aMember.Name( ),
                            memVal = aMember.ValueAsString( );
                            // fix the output format vs. the internal representation
                            if ( memName == "relationship" )
                            {
```

-continued

```
                    efDict.PutName( "AFRelationship", memVal );
                } else if ( memName == "description" ) {
                    efDict.Put( "Desc", memVal );
                } else
                    efDict.Put( memName.c_str( ), memVal );
                    doclter++;
                }
                succ = MG_TRUE;
                HANDLER
                std::string errStr =
                    ASUtils::GetErrorString( ERRORCODE );
                END_HANDLER
            }
        }
    } else {
        // Use the PDFLibrary to create a new attachment from the provided data
        PDFileAttachment
        pdfa = PDFileAttachmentFromCosObj( efObj );
        succ = _WritePDFileAttachment( inRequest, pdfa );
        }
    }
}
// if successful, have the PDFLibrary write out the changes
DURING
if ( succ == MG_TRUE )
mProcessor->SaveDocument( );
HANDLER
std::string errStr = ASUtils::GetErrorString( ERRORCODE );
succ = MG_FALSE;
// failure
END_HANDLER
mProcessor->CloseDocument( );
if ( succ == MG_TRUE ) {
    MGResponse
    resp( inRequest );
    resp.SendStatusOK( );
    return MG_TRUE;
} else
    return MG_FALSE;
}
```

Figure 4:
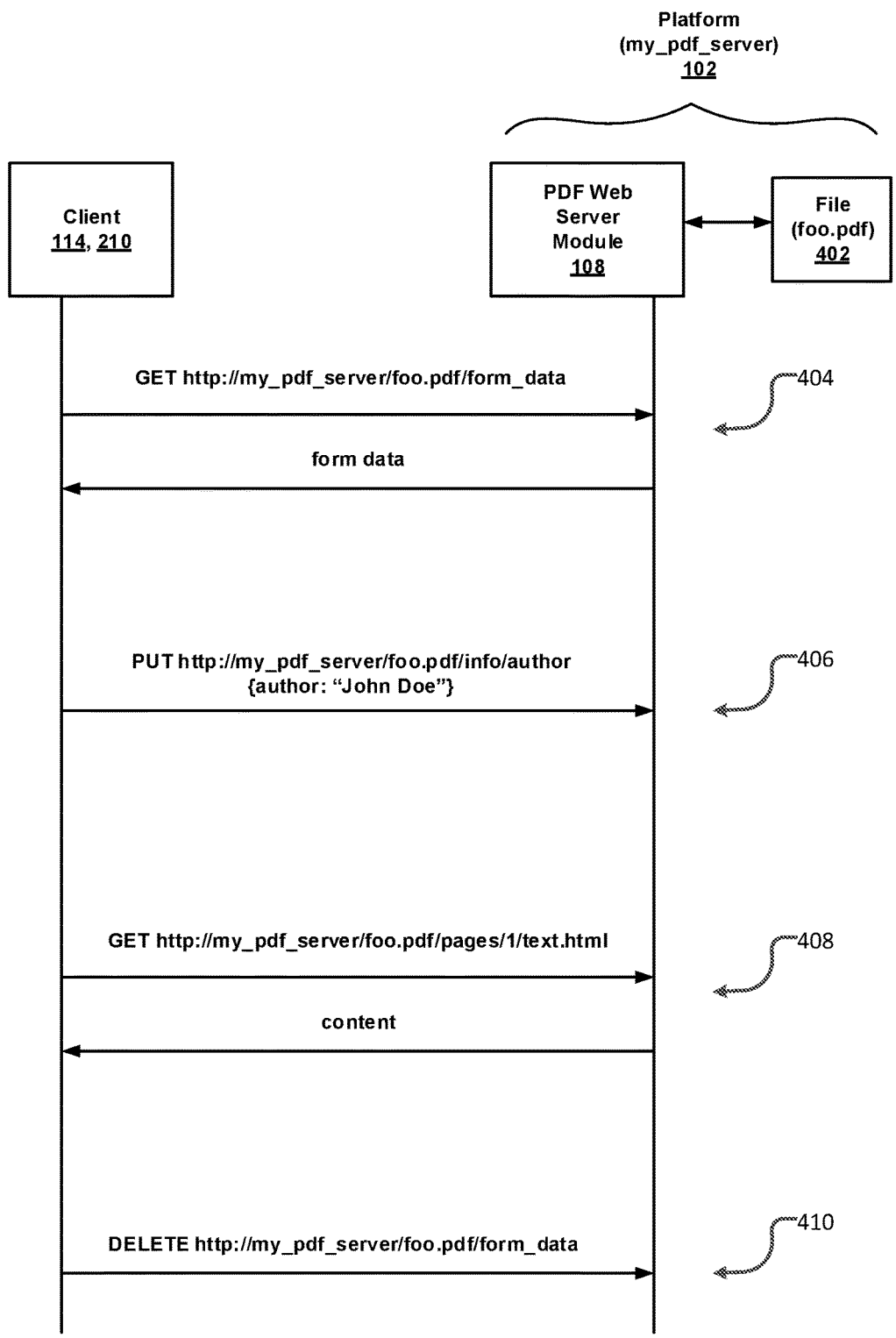
FIG. 4 illustrates a message flow diagram between a client and a PDF web server module, configured in accordance with an embodiment of the present disclosure.

FIG. 4 illustrates a message flow diagram 400 between a client 114, 120 and a PDF web server module 108, configured in accordance with an embodiment of the present disclosure. A first example interaction 404 includes an HTTP request from the client in the form:

GET http://my_pdf_server/foo.pdf/form_data

The HTTP verb "GET" is used to indicate a "read" type of operation. The URL specifies the particular PDF web server platform 102 to be used, in this case the server named "my_pdf_server." The URL also specifies the file name "foo.pdf," and the component to be retrieved, in this case "form_data." The interaction concludes with a response that transmits the form data associated with file foo.pdf back to the client.

A second example interaction 406 includes an HTTP request from the client:

PUT http://my_pdf_server/foo.pdf/info/author {author: "John Doe"}

The HTTP verb "PUT" is used to indicate a "write" or modification type of operation. As above, the URL specifies the particular PDF web server platform 102 to be used, the file name "foo.pdf," and the component on which to operate, in this case the information attribute "author." The HTTP request of this example further includes an application specific data field, or request body, to specify the new author name, "John Doe." The request body may be interpreted by the HTTP parsing module 302 and transformed into a format suitable for use by the PDF library interface module which may provide that data as an argument to one of the invoked PDF parser library functions.

In some embodiments, when file modifications are requested, the original PDF document may be modified. In other embodiments, a copy of the document may be created for association with the requesting user, and the copy may be modified.

A third example interaction 408 includes an HTTP request from the client:

GET http://my_pdf_server/foo.pdf/pages/1/text.html

As before, the HTTP verb "GET" is used to indicate a "read" type of operation. The URL specifies the PDF web server platform 102 to be used, the file name "foo.pdf," and the component on which to operate, in this case page 1 of the text. The interaction concludes with a response that transmits the first page of text associated with the file foo.pdf back to the client. The content may be transmitted in any suitable format including native PDF structures, JavaScript Object Notation (JSON), and Extensible Markup Language (XML).

A fourth example interaction 410 includes an HTTP request from the client:

DELETE http://my_pdf_server/foo.pdf/form_data

The HTTP verb "DELETE" is used to indicate a "write" or modification type of operation, in this case a request to delete or remove all form data from the file foo.pdf (e.g., a form reset operation). As with other types of file modification requests, in some embodiments, the original stored PDF file may be modified, while in other embodiments, a user associated copy of the PDF file may be modified.

In a similar manner, though not illustrated in the figure, the verb "POST" could be used to add annotations to a document and the verb "PATCH" could be used to update other resources associated with the document such as, for example, metadata. The particular verbs and their usage, as illustrated here, are provided as examples and different embodiments may implement any of the HTTP verbs in any suitable manner.

Methodology

Figure 5:
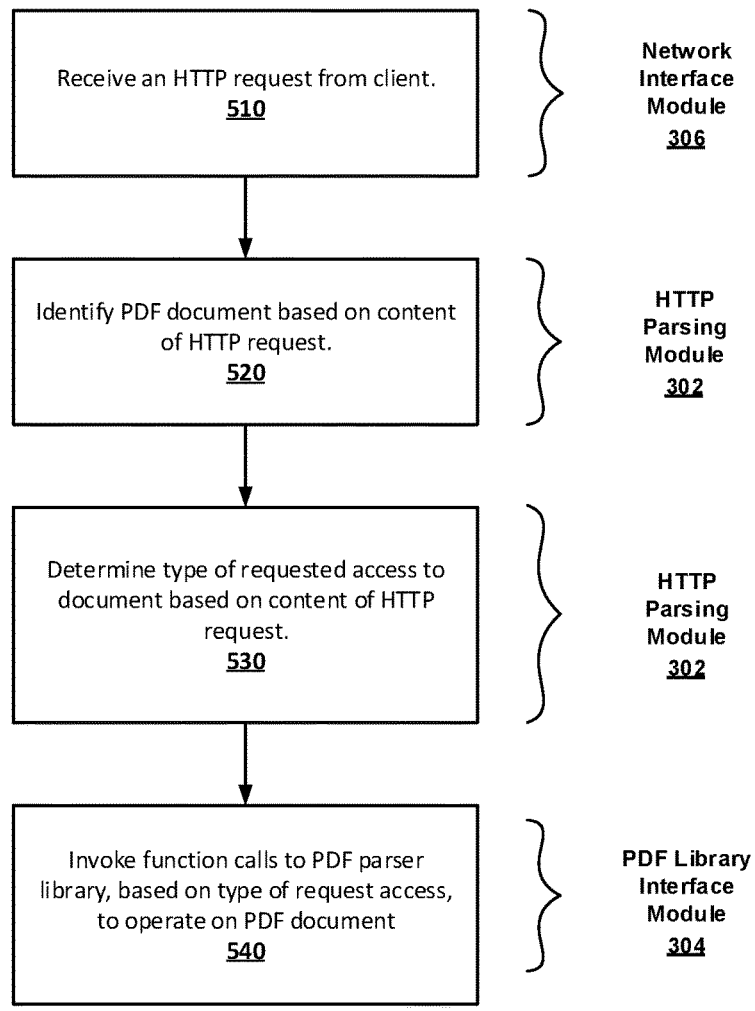
FIG. 5 is a flowchart illustrating a method for manipulation of PDF file content using HTTP requests, in accordance with an embodiment of the present disclosure.

FIG. 5 is a flowchart illustrating a method 500 for manipulation of PDF file content using HTTP requests, in accordance with an embodiment of the present disclosure. As can be seen, the method is described with reference to the configuration of PDF web server module 108 of FIG. 3. However, any number of PDF web server configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration.

The method commences, at operation 510, by receiving an HTTP request from a client. This operation may be performed by network interface module 306. The HTTP request may be received through a network connection, for example through the internet. In some embodiments, the request may be received through a TCP port from another process executing on a local machine, including, for example, the same platform that hosts the PDF web server.

The method continues, at operation 520, by identifying a PDF document based on the content of the HTTP request. In some embodiments, the HTTP request may include a Uniform Resource Locator (URL) path with a syntax configured to specify the PDF document as well as components of the document. For example, the URL "http://my_pdf_server/foo.pdf/form_data" may specify a "form_data" attribute associated with the PDF file named "foo.pdf" on the PDF web server "my_pdf_server."

Next, at operation 530, the type of requested access to the identified PDF document is determined, further based on the content of the HTTP request and in particular based on the HTTP verb included in the request. Types of access requests may include, for example, modification of content of the identified PDF document, modification of attributes of the identified PDF document, and extraction or retrieval of content of the identified PDF document. HTTP request verbs corresponding to these types of access may include, for example, "GET," "PUT," "POST," and "DELETE."

The request "GET http://my_pdf_server/foo.pdf/pages/1/text.html" may specify a request to extract the content of page 1 of the document "foo.pdf." The HTTP parsing module 302 may be configured perform operations 520 and 530 by parsing the syntax of the request to determine the file name and type of access.

At operation 540, one or more function calls to a PDF parser library are invoked, based on the type of requested access, to operate on the identified PDF document to perform the requested type of access. These operations may be performed on components of the PDF documents that are selected based on a Uniform Resource Locator (URL) path included in the HTTP request. Examples of such components may include text content, images, annotations, attachments, bookmarks, and metadata. The function calls may be invoked by the PDF library interface module 304. The PDF parser library may be configured to provide any functions necessary to perform any of the various types of operations on a PDF file or file components that may be requested.

In some embodiments, additional operations may be performed. For example, the results generated by the invoked function calls may be transmitted to the client as an HTTP response. The results may include status information and/or content of the identified PDF document. In some embodiments, the transmitted content may formatted as native PDF data structures. In some embodiments, the transmitted content may be formatted as JavaScript Object Notation (JSON), Extensible Markup Language (XML), or any other suitable format that may be relatively convenient for further processing by the client. Additionally, in some embodiments, the method may be performed by a PDF viewer.

Example Server Platform

Figure 6:
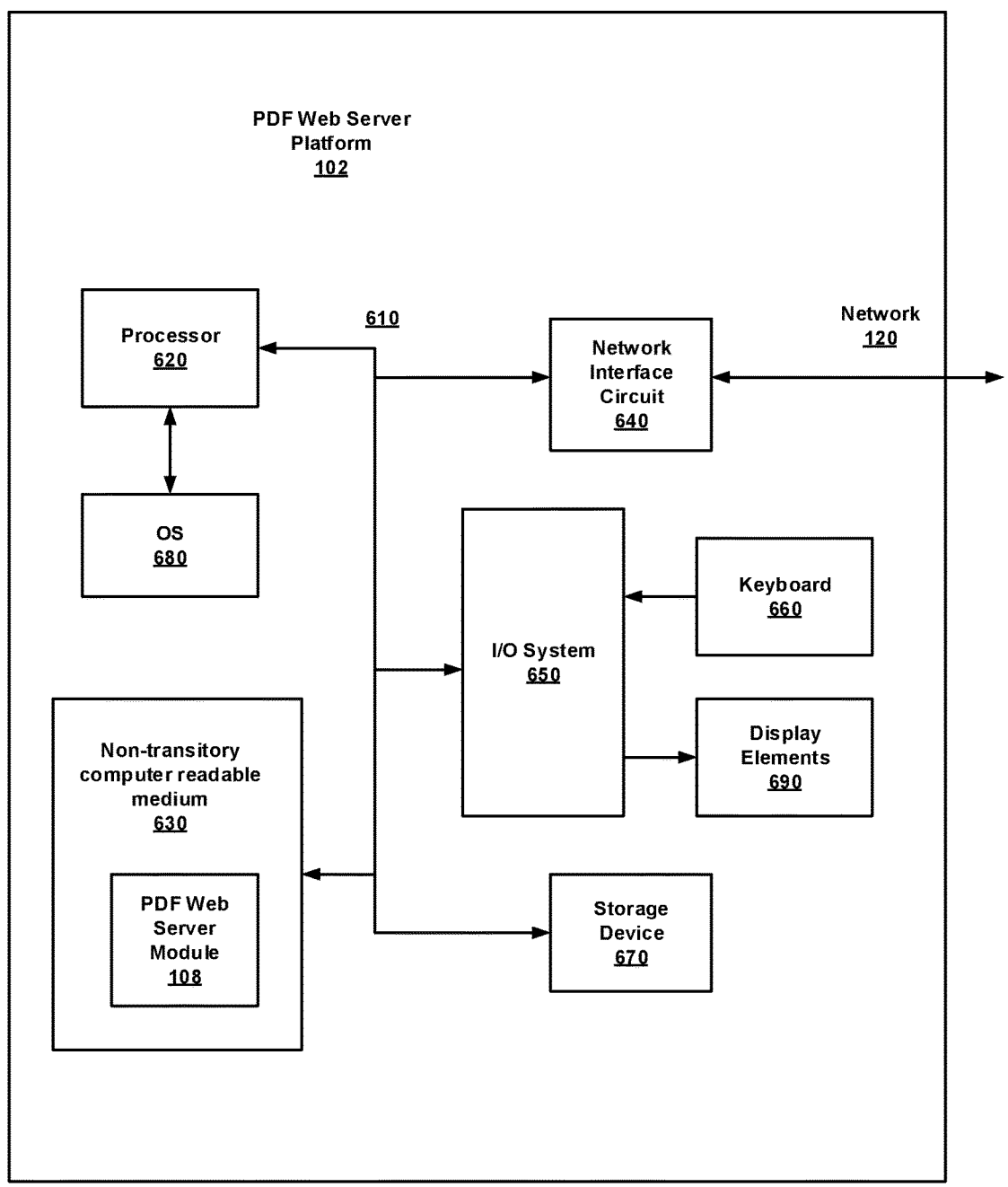
FIG. 6 is a block diagram schematically illustrating a computing device configured to perform any of the techniques as variously described in this disclosure, configured in accordance with an embodiment of the present disclosure.

FIG. 6 is a block diagram schematically illustrating a computing device 600 that may be used to perform any of the techniques as variously described in this disclosure. For example, the PDF web server platform 102 of FIG. 1, or any portions thereof, and the methodologies of FIG. 5, or any portions thereof, may be implemented in the computing device 600. The computing device 600 may be any computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 600 includes one or more storage devices 670 and/or non-transitory computer-readable media 630 having encoded thereon one or more computer-executable instructions or software for implementing techniques as variously described in this disclosure. The storage devices 670 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 670 may include other types of memory as well, or combinations thereof. The storage device 670 may be provided on the computing device 600 or provided separately or remotely from the computing device 600. The non-transitory computer-readable media 630 may include, but are not limited to, one or more types of hardware memory, non-transitory tangible media (for example, one or more magnetic storage disks, one or more optical disks, one or more USB flash drives), and the like. The non-transitory computer-readable media 630 included in the computing device 600 may store computer-readable and computer-executable instructions or software for implementing various embodiments. The computer-readable media 630 may be provided on the computing device 600 or provided separately or remotely from the computing device 600.

The computing device 600 also includes at least one processor 620 for executing computer-readable and computer-executable instructions or software stored in the storage device 670 and/or non-transitory computer-readable media 630 and other programs for controlling system hardware. Virtualization may be employed in the computing device 600 so that infrastructure and resources in the computing device 600 may be shared dynamically. For example, a virtual machine may be provided to handle a process running on multiple processors so that the process appears to be using only one computing resource rather than multiple computing resources. Multiple virtual machines may also be used with one processor.

As can be further seen, a bus and/or interconnect 610 is also provided to allow for communication between the various components listed above and/or other components not shown. Computing device 600 can be coupled to a network 120 (e.g., a local or wide area network such as the internet), through network interface circuit 640 to allow for communications with other computing devices, platforms, resources, and clients.

A user may interact with the computing device 600 through an input/output system 650 that interfaces with devices such as keyboard 660 and display element (screen/monitor) 690 which may provide a user interface to accept commands and display results including PDF files and associated information. The computing device 600 may include other I/O devices (not shown) for receiving input from a user, for example, a joystick, a game controller, a pointing device (e.g., a mouse, a user's finger interfacing directly with a display device, etc.), or any suitable user interface. The computing device 600 may include other suitable conventional I/O peripherals. The computing device 600 can include and/or be operatively coupled to various suitable devices for performing one or more of the aspects as variously described in this disclosure, such as digital cameras for acquiring digital images.

The computing device 600 may run any operating system (OS) 680, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing device 600 and performing the operations described in this disclosure. In an embodiment, the operating system may be run on one or more cloud machine instances.

As will be appreciated in light of this disclosure, the various modules and components of the system, such as the web server module 108, the HTTP parsing module 302, the PDF library interface module 304, the network interface module 306, or any combination of these, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors and/or databases in different configurations and arrangements, and that the depicted embodiments are not intended to be limiting. Various components of this example embodiment, including the computing device 600, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a mouse, a touch pad, a touch screen, etc., are not shown but will be readily apparent.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Example Embodiments

Numerous example embodiments will be apparent, and features described herein can be combined in any number of configurations.

Example 1 includes a method for providing access to Portable Document Format (PDF) files using Hyper Text Transfer Protocol (HTTP) requests. The method includes: receiving an HTTP request from a client; identifying a PDF document, based on content of the HTTP request; determining a type of requested access to the identified PDF document, based on a verb included in the HTTP request; and invoking one or more function calls to a PDF parser library, based on the type of requested access, the function calls to operate on the identified PDF document to perform the requested type of access.

Example 2 includes the subject matter of Example 1, further comprising transmitting results generated by the invoked function calls to the client as an HTTP response.

Example 3 includes the subject matter of Examples 1 or 2, wherein the results comprise content of the identified PDF document formatted as one or more of: native PDF data structures; JavaScript Object Notation (JSON); and Extensible Markup Language (XML).

Example 4 includes the subject matter of any of Examples 1-3, wherein the HTTP request comprises one or more of HTTP request verbs "GET," "PUT," "POST," and "DELETE."

Example 5 includes the subject matter of any of Examples 1-4, further comprising selecting components of the identified PDF document, for access, based on a Uniform Resource Locator (URL) path included in the HTTP request.

Example 6 includes the subject matter of any of Examples 1-5, wherein the type of requested access comprises modification of content of the identified PDF document, modification of attributes of the identified PDF document, and extraction of content of the identified PDF document.

Example 7 includes the subject matter of any of Examples 1-6, wherein the method is performed by a PDF viewer.

Example 8 includes a system for providing access to Portable Document Format (PDF) files using Hyper Text Transfer Protocol (HTTP) requests. The system includes: a storage facility configured to store one or more PDF documents; and one or more processors configured to: receive an HTTP request from a client; identify a PDF document of the one or more PDF documents in the storage facility, based on content of the HTTP request; determine a type of requested access to the identified PDF document, based on a verb included in the HTTP request; and invoke one or more function calls to a PDF parser library, based on the type of requested access, the function calls to operate on the identified PDF document to perform the requested type of access.

Example 9 includes the subject matter of Example 8, wherein the one or more processors are further configured to transmit results generated by the invoked function calls to the client as an HTTP response.

Example 10 includes the subject matter of Examples 8 or 9, wherein the results comprise content of the identified PDF document formatted as one or more of: native PDF data structures; JavaScript Object Notation (JSON); and Extensible Markup Language (XML).

Example 11 includes the subject matter of any of Examples 8-10, wherein the HTTP request comprises one or more of HTTP request verbs "GET," "PUT," "POST," and "DELETE."

Example 12 includes the subject matter of any of Examples 8-11, wherein the one or more processors are further configured to select components of the identified PDF document, for access, based on a Uniform Resource Locator (URL) path included in the HTTP request.

Example 13 includes the subject matter of any of Examples 8-12, wherein the type of requested access comprises modification of content of the identified PDF document, modification of attributes of the identified PDF document, and extraction of content of the identified PDF document.

Example 14 includes a computer program product comprising one or more non-transitory computer readable mediums encoded with instructions that when executed by one or more processors cause a process to be carried out for providing access to Portable Document Format (PDF) files using Hyper Text Transfer Protocol (HTTP) requests, the process comprising: receiving an HTTP request from a client; identifying a PDF document, based on content of the HTTP request; determining a type of requested access to the identified PDF document, based on a verb included in the HTTP request; selecting components of the identified PDF document based on a Uniform Resource Locator (URL) path included in the HTTP request; and invoking one or more function calls to a PDF parser library, based on the type of requested access, the function calls to operate on the identified PDF document to perform the requested type of access on the selected components.

Example 15 includes the subject matter of Example 14, the process further comprising transmitting results generated by the invoked function calls to the client as an HTTP response.

Example 16 includes the subject matter of Examples 14 or 15, wherein the results comprise content of the identified PDF document formatted as one or more of: native PDF data structures; JavaScript Object Notation (JSON); and Extensible Markup Language (XML).

Example 17 includes the subject matter of any of Examples 14-16, wherein the HTTP request comprises one or more of HTTP request verbs "GET," "PUT," "POST," and "DELETE."

Example 18 includes the subject matter of any of Examples 14-17, wherein the selected components comprise one or more of text content, images, annotations, attachments, bookmarks, and metadata.

Example 19 includes the subject matter of any of Examples 14-18, wherein the type of requested access comprises modification of content of the identified PDF document, modification of attributes of the identified PDF document, and extraction of content of the identified PDF document.

Example 20 includes the subject matter of any of Examples 14-19, wherein the process is performed by a PDF viewer.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for extracting content from a Portable Document Format (PDF) document using a Hyper Text Transfer Protocol (HTTP) request, the method comprising:
   receiving, by a processor, an HTTP GET request from a client, wherein the HTTP GET request includes a Uniform Resource Locator (URL) path for the PDF document, wherein the PDF document includes a plurality of components, and wherein the URL path defines an address for the PDF document and identifies a particular one of the plurality of components included in the PDF document;
   in response to receiving the HTTP GET request, identifying, by the processor, the PDF document and the particular one of the plurality of components, based on the URL path included in the HTTP GET request;
   identifying a function call provided by a PDF parser library, wherein the identified function call includes code, that when invoked, causes content to be extracted from the PDF document;
   invoking, by the processor, the identified function call, thereby causing the particular component to be extracted from the identified PDF document; and
   sending an HTTP response to the client that includes the extracted particular component, but that does not include the entire PDF document.

2. The method of claim 1, wherein the extracted particular component that is sent to the client is formatted as one or more of:
   native PDF data structures;
   JavaScript Object Notation (JSON); and
   Extensible Markup Language (XML).

3. The method of claim 1, wherein the particular component is selected from a group consisting of textual content, an image, an annotation, an attachment, a bookmark, and metadata.

4. The method of claim 1, wherein the HTTP GET request is received by a PDF viewer that passes the HTTP GET request to the processor, and wherein the HTTP response is sent from the PDF viewer to the client.

5. The method of claim 1, wherein:
   the particular component identified in the URL path is form data included in the PDF document;
   invoking the identified function call causes the form data to be extracted from the PDF document; and
   the HTTP response sends the form data to the client without sending the entire PDF document to the client.

6. The method of claim 1, wherein the HTTP GET request is received by a PDF viewer that passes the HTTP GET request to the processor, and wherein the HTTP response is sent from the PDF viewer to a web browser executing on the client.

7. The method of claim 1, wherein the HTTP GET request is received by a PDF viewer that passes the HTTP GET request to the processor, and wherein the PDF viewer has included therein the PDF parser library.

8. A system to add content to a Portable Document Format (PDF) document using a Hyper Text Transfer Protocol (HTTP) request, the system comprising:

a storage facility configured to store the PDF document, wherein the PDF document includes a plurality of components; and one or more processors configured to:
receive an HTTP PUT request from a client, wherein the HTTP PUT request includes a Uniform Resource Locator (URL) path for the PDF document, wherein the URL path defines an address for the PDF document and identifies a particular one of the plurality of components included in the PDF document, and wherein the HTTP PUT request includes particular data to be added to the identified particular component of the PDF document;

identify the PDF document in the storage facility, based on the address included in the HTTP PUT request;

identify a function call provided by a PDF parser library, wherein the identified function call includes code, that when invoked, causes content to be added to the PDF document; and invoke the identified function call, wherein invoking the identified function call includes providing an argument to the function call, wherein the argument includes the particular data included in the HTTP PUT request, and wherein invoking the identified function call causes the particular data to be added to the identified particular component of the PDF document.

9. The system of claim 8, wherein the particular data to be added to the particular component is selected from a group consisting of textual content, an image, an annotation, an attachment, a bookmark, and metadata.

10. The system of claim 8, wherein receiving the HTTP PUT request comprises receiving the HTTP PUT request by a PDF viewer that passes the HTTP PUT request to the one or more processors.

11. The system of claim 8, wherein receiving the HTTP PUT request comprises receiving the HTTP PUT request by a PDF viewer that passes the HTTP PUT request to the one or more processors, and wherein the PDF viewer has included therein the PDF parser library.

12. The system of claim 8, wherein the particular component is a form field and wherein invoking the function call causes the particular data to be added to the form field.

13. A computer program product comprising one or more non-transitory computer readable mediums encoded with instructions that when executed by one or more processors cause a process to be carried out for extracting content from a Portable Document Format (PDF) document using a Hyper Text Transfer Protocol (HTTP) GET request, the process comprising:

receiving the HTTP GET request from a client, wherein the HTTP GET request includes a Uniform Resource Locator (URL) path for the PDF document, wherein the PDF document includes a plurality of components, and wherein the URL path defines an address for the PDF document and identifies a particular one of the plurality of components included in the PDF document;

in response to receiving the HTTP GET request, identifying the PDF document, based on the address included in the HTTP GET request;

identifying a function call provided by a PDF parser library, wherein the identified function call includes code, that when invoked, causes content to be extracted from the PDF document;

invoking the identified function call, thereby causing the particular component to be extracted from the identified PDF document; and sending an HTTP response to the client that includes the extracted particular component, but that does not include the entire PDF document.

14. The computer program product of claim 13, wherein the extracted particular component that is sent to the client is formatted as one or more of:
native PDF data structures;
JavaScript Object Notation (JSON); and
Extensible Markup Language (XML).

15. The computer program product of claim 13, wherein the particular component is selected from a group consisting of text content, images, annotations, attachments, bookmarks, and metadata.

16. The computer program product of claim 13, wherein receiving the HTTP GET request comprises receiving the HTTP GET request by a PDF viewer that passes the HTTP GET request to the one or more processors, and wherein sending the HTTP response comprises sending the HTTP response from the PDF viewer to the client.

17. The computer program product of claim 13, wherein:
the particular component identified in the URL path is form data included in the PDF document;
invoking the identified function call causes the form data to be extracted from the PDF document; and
sending the HTTP response comprises sending the form data to the client without sending the entire PDF document to the client.

18. The computer program product of claim 13, wherein receiving the HTTP GET request comprises receiving the HTTP GET request by a PDF viewer that passes the HTTP GET request to the one or more processors, and wherein sending the HTTP response comprises sending the HTTP response from the PDF viewer to a web browser executing on the client.

19. The computer program product of claim 13, wherein receiving the HTTP GET request comprises receiving the HTTP GET request by a PDF viewer that passes the HTTP GET request to the one or more processors, and wherein the PDF viewer has included therein the PDF parser library.

* * * * *